United States Patent [19]

Nakanishi

[11] 4,393,426
[45] Jul. 12, 1983

[54] TAPE RECORDER HEAD ADJUSTING MECHANISM

[75] Inventor: Yasuyuki Nakanishi, Nagaokakyo, Japan

[73] Assignee: Mitsubishi Denki Kabushiki Kaisha, Tokyo, Japan

[21] Appl. No.: 260,989

[22] Filed: May 6, 1981

[30] Foreign Application Priority Data

May 16, 1980 [JP] Japan ................................. 55/65728

[51] Int. Cl.³ ........................ G11B 5/54; G11B 21/22
[52] U.S. Cl. .................................... 360/105; 360/109
[58] Field of Search ............................... 360/104–106, 360/109, 78

[56] References Cited

U.S. PATENT DOCUMENTS

| | | | |
|---|---|---|---|
| 3,751,603 | 8/1973 | Prieur et al. | 360/105 |
| 3,809,827 | 5/1974 | Oyaba | 360/105 X |
| 3,846,838 | 11/1974 | Okamoto et al. | 360/106 |
| 3,943,568 | 3/1976 | Suzuki | 360/106 |
| 4,028,735 | 6/1977 | Miyazaki | 360/106 |
| 4,158,212 | 6/1979 | Dattilo | 360/109 |
| 4,198,544 | 4/1980 | Buglewicz | 360/106 X |

*Primary Examiner*—John H. Wolff
*Attorney, Agent, or Firm*—Oblon, Fisher, Spivak, McClelland & Maier

[57] ABSTRACT

A tape recorder head adjusting mechanism includes a small gear wheel rotatably driven; a large gear wheel interlocking with the small gear wheel; a cam fixed to and rotated with the large gear wheel; a movable pin in contact with the cam; a head base moved back and forth by the movable pin; and a head fixed to said head base.

3 Claims, 4 Drawing Figures

TAPE RECORDER HEAD ADJUSTING MECHANISM

BACKGROUND OF THE INVENTION

1. Field of the Invention:

The present invention relates to a tape recorder. More particularly, it relates to an improvement of a head moving mechanism.

2. Description of Prior Art:

FIG. 1 shows the conventional head moving mechanism of a cassette tape recorder. A head (3) is positioned facing a tape (2) held in a cassette casing (1). The head (3) is secured on a head base (4) on which a movable pin (5) is set. A fixed pin (6) is set on a main base (10) so as to enter into a guide hole (7) formed in the head base (4). In this state, the head base (4) with the head (3) is movable in the longitudinal direction of the guide hole (7). The head base (4), pulled by a pair of springs (8), is moved towards the tape (2) until the fixed pin (6) make contact with the extreme end of the guide hole (7), that is, the front surface of the head (3) is brought into contact with the tape (2). On the other hand, when the head (3) is moved backwards, it is necessary to carry out two manual operations; the first operation for moving the head base (4) backwards via the movable pin (5) by a component of operational force and the second operation for engaging a hook (9) with a movable pin (5) after the completion of the first operation. Therefore, if a single manual operation is desired instead of the two separate operations, an additional mechanism must be incorporated.

In order to add the function of taking the tape out at a portion in which desired data is recorded, that is, a heading function, it is necessary to position the head (3) at a slightly rearward position (normally, in the range between 1 mm and 2 mm), but should not move to the rearmost position. It is, therefore, in this case, necessary to provide a mechanism which sets the position of the head (3) at three different positions. However, there has not been known a mechanism for performing the operation described above except for the structure as shown in FIG. 1 in which two head moving mechanisms are provided. This structure has the disadvantages of making it complicated and requiring larger finger pressure in the manual operation.

SUMMARY OF THE INVENTION

It is an object of the present invention to provide a tape recorder provided with an improved head moving mechanism capable of overcoming the disadvantages of the conventional tape recorder.

It is another object of the present invention to provide a tape recorder having a simple head moving mechanism which requires only a small manual operation force.

The foregoing and other objects of the present invention have been attained by providing a tape recorder which comprises: a small gear wheel rotatably driven; a large gear wheel interlocking with said small gear wheel; a cam rotated with said large gear wheel in one piece; a movable pin in contact with said cam; a head base moved back and forth by said movable pin; and a head fixed to said head base.

Briefly, the present invention is to move a movable pin by a cam which rotates with a large gear wheel interlocking with a small gear wheel to move a head base through the movement of the movable pin.

BRIEF DESCRIPTION OF THE DRAWINGS

The same reference numerals designate the same or corresponding parts throughout several figures.

DETAILED DESCRIPTION OF THE PREFERRED EMBODIMENT

The features of the present invention will become apparent from the following detailed description with reference to drawings.

Figure 1:
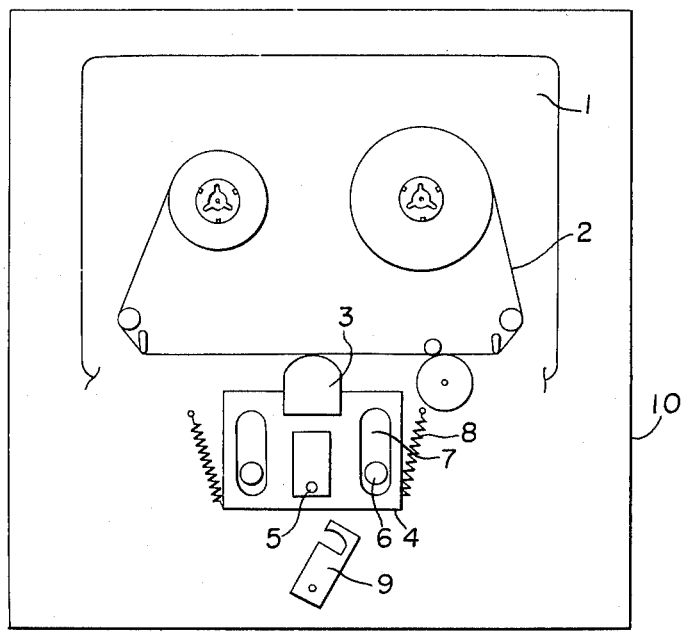
FIG. 1 is a schematic view of a head moving mechanism of a cassette tape recorder.
Figure 2:
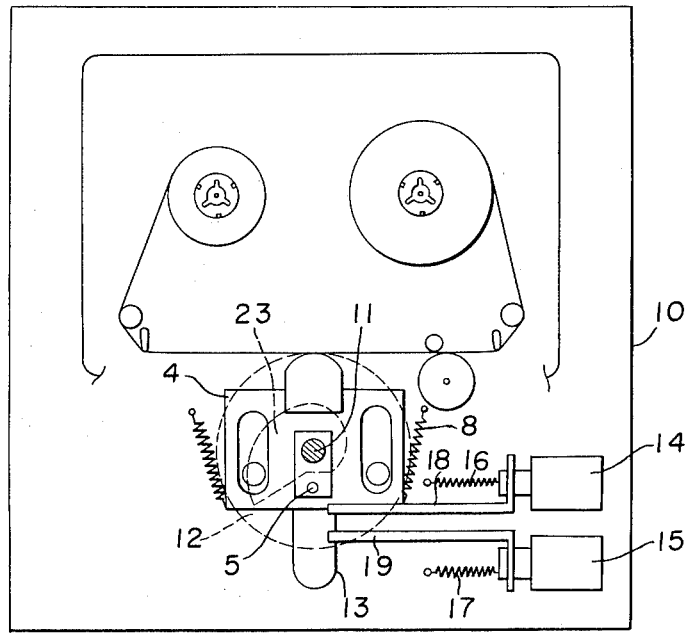
FIG. 2 is a plane view of an embodiment of the present invention.
Figure 3:
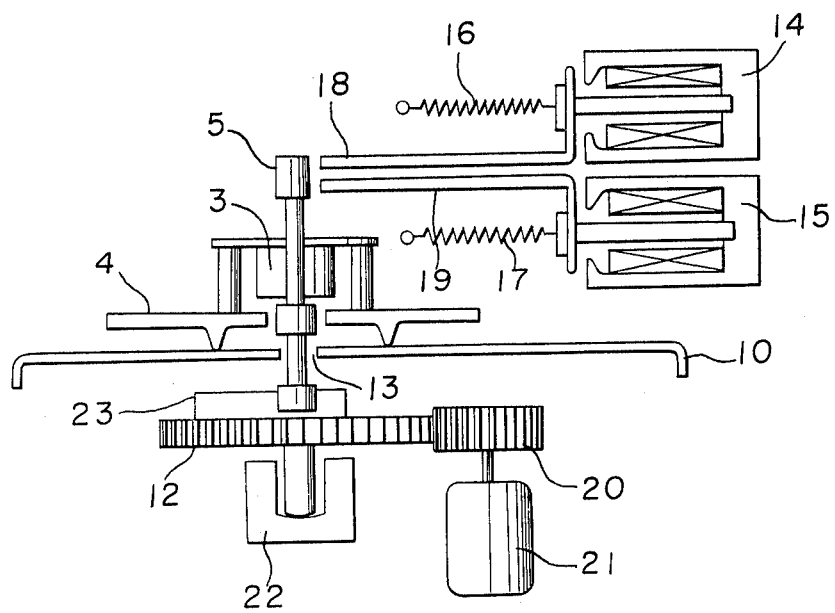
FIG. 3 is a front view of the important portion of the embodiment shown in FIG. 2.
Figure 4:
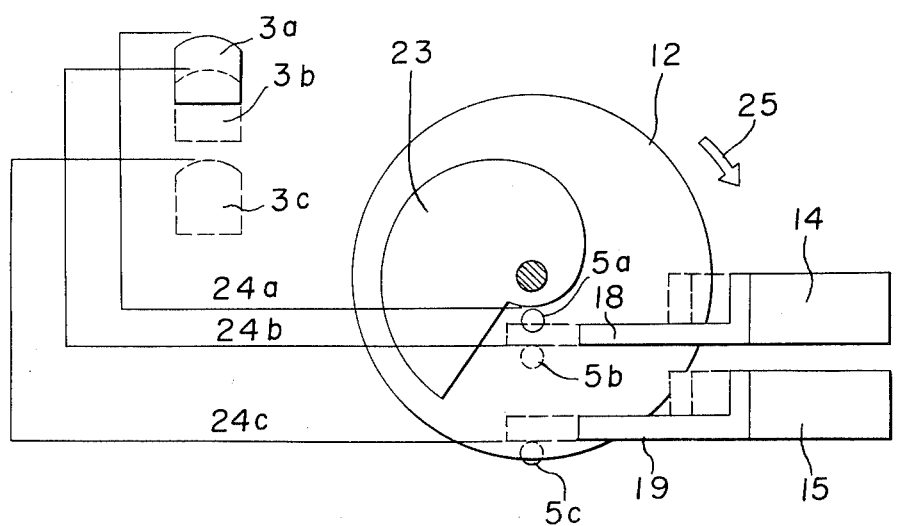
FIG. 4 is a schematic plane view illustrating the operation of the embodiment shown in FIGS. 2 and 3.

FIG. 2 is a plane view of an embodiment of the present invention; FIG. 3 is a front view of the important portion of FIG. 2 and FIG. 4 is a schematic plane view for illustrating an operation of the embodiment as shown in FIGS. 2 and 3.

A large gear wheel (12) is fixed to a small gear wheel (20) which is rotatably held by a bearing (22). The movable pin (5) extends through a main base (10) into a movable pin-receptive groove (13). A heading solenoid (14) and an eject solenoid (15) are fixedly positioned and the plungers of both the solenoids are respectively actuated in the pulling direction by a heading spring (16) and an eject spring (17). Each plunger of the solenoids (14), (15) is respectively connected to a heading plate (18) and an eject plate (19). The small gear wheel (20), rotatably driven by a motor (21), is so constructed as to mesh with the large gear wheel (12) whereby, when the small gear wheel (20) is driven by the motor (21), the large gear wheel (12) meshed therewith and held by the bearing (22) is driven. A cam (23) is fixed on the large gear wheel (12) so that the cam is rotated together with the large gear wheel (12).

The operation of the embodiment of the present invention will be described with reference to FIG. 4. In FIG. 4, position lines (24a), (24b) and (24c) indicate the positions of the head (3) and the movable pin (5) in each mode taken by the tape recorder of the present invention wherein the position line (24a) corresponds to the position in the play (or recording) mode; the position line (24b) corresponds to the position in the heading mode; and the position line (24c) corresponds to the position in the eject (or the rapid feeding) mode. The positions of the head (3) and the movable pin (5) in each mode are indicated by the same reference numerals but the addition of characters a, b and c respectively.

The movable pin (5) passing through the movable pin receptive groove (13) of the main base (10) is positioned facing the cam surface of the cam (23) and the head base (4) is forced forwards by the springs (8) whereby the movable pin (5) is kept in contact with the cam surface of the cam (23). When the large gear wheel (12) is rotated, the cam (23) is also rotated. In response to this, the movable pin (5) is moved back and forth along the movable pin receptive groove (13) and on the cam surface of the cam (23) and acccordingly, the head base (4) is also moved back and forth. In this state, when either the heading plate (18) or the eject plate (19) is brought to the projecting state, it makes contact with the peripheral surface of the movable pin (5), to secure the movable pin (5) at the predetermined position. A further specified embodiment will be described below. The position (3a) of the head (3) and the position (5a) of the movable pin (5) shown by a solid line FIG. 4 correspond to the position line (24a) which means that they are in the play mode. In this state, the movable pin (5) is in contact with the cam surface of the cam (23). When the large gear wheel (12) is rotated in the arrow direction (25) and the cam is similarly rotated, the movable pin (5) is lowered in FIG. 4 and returned to the original position by one revolution of the cam (23). The operation of the head (3) when it is positioned at the heading position (3b) is as follows: firstly, the cam (23) is rotated to lower the movable pin in FIG. 4; one revolution of the cam (23) permits the movable pin (5) to return to the original position (5a) by the action of springs (8), while just before the returning, electric conduction to the heading solenoid (14) is interrupted so that the heading plate (18) projects by the pulling force of the heading spring (16). On the other hand, the eject solenoid (15) is kept in an electric conductive condition so that the eject plate (19) remains non-projected. As soon as the lowered movable pin (5) returns toward the original position (5a), it makes contact with the heading plate (18) whereby the movable pin (5) remains in the heading position (5b). Thus the head (3) is at the position (3b) which corresponds to the heading position line (24b) and the heading mode is attained. In this embodiment, the cam (23) is controlled to be stopped at the completion of one revolution.

The eject mode can be obtained by the following operation. The cam (23) again makes one revolution. Just before the completion of the revolution, electric conduction to the eject solenoid (15) is broken whereby the eject plate (19) projects to hold the movable pin (5) at the eject position (5c). Simultaneously, the head (3) is at the position (3c) which corresponds to the eject position line (24c).

In the embodiment described above, the head (3) can be stopped at two or more different positions in the same manner as in the conventional tape recorder having a heading function by moving the head (3) by the revolution of the cam (2) and providing the plates (18), (19) which made contact with the movable pin (5) in accordance with the movement of the head (3).

The feature of the present invention is that the head is moved by the cam and this feature can be applied to other types of tape recorders without the heading function or other than cassette tape recorders.

As described above, in accordance with the present invention, a head moving mechanism of simple structure can be obtained and the necessity of force required in manual operation can be reduced because a head is moved by the revolution of a cam. If desired, plates making contact with a movable pin in accordance with the movement of the head can easily be attached. Thus, the head moving mechanism of the present invention can be applied to tape recorders such as ones having the heading function.

I claim:

1. A tape recorder head adjusting mechanism comprising:

a movable pin constrained for reciprocation along a path, means for intersecting a recording tape with said path, a head base including means for moving said head base with said pin, a head fixed to said head base, whereby said head is movable towards and away from said recording tape along said path, a cam rotatable about an axis transverse to said path, means for biasing said pin into contact with a cam surface of said cam, means for rotating said cam about said axis, whereby rotation of said cam causes said pin, said head base and said head to move along said path, first and second movable plates reciprocatable in a first direction transverse to said path, means for selectively moving said first plate into intersection with said path at a first position along said path, and means for selectively moving said second plate into intersection with said path at a second position, spaced from said first position, along said path, whereby either said first plate or said second plate can selectively restrain said pin in one of three positions along said path, so that said head can be selectively restrained in three positions relative to said tape.

2. A tape recorder according to claim 1 further comprising a solenoid for controlling the movement of said movable plate.

3. A tape recorder according to claim 1 wherein said three head positions respectively comprise a play position, a heading position and an eject position.

* * * * *